(12) United States Patent
Newman et al.

(10) Patent No.: US 7,715,070 B2
(45) Date of Patent: May 11, 2010

(54) CREATION OF TRANSFORM-BASED PROFILES BY A MEASUREMENT-BASED COLOR MANAGEMENT SYSTEM

(75) Inventors: Todd D. Newman, Palo Alto, CA (US); John S. Haikin, Fremont, CA (US)

(73) Assignees: Canon Kabushiki Kaisha, Tokyo (JP); Microsoft Corporation, Redmond, WA (US)

(*) Notice: Subject to any disclaimer, the term of this patent is extended or adjusted under 35 U.S.C. 154(b) by 1031 days.

(21) Appl. No.: 11/121,409

(22) Filed: May 3, 2005

(65) Prior Publication Data

US 2006/0250623 A1 Nov. 9, 2006

(51) Int. Cl.
*G03F 3/08* (2006.01)

(52) U.S. Cl. ............... 358/518; 358/1.9; 358/519; 382/162; 382/167

(58) Field of Classification Search ............ 358/1.9, 358/518–523; 382/162, 167
See application file for complete search history.

(56) References Cited

U.S. PATENT DOCUMENTS

| | | | |
|---|---|---|---|
| 6,307,961 B1 * | 10/2001 | Balonon-Rosen et al. ... | 382/167 |
| 6,501,850 B2 | 12/2002 | Setchell, Jr. ............ | 382/162 |
| 6,603,483 B1 * | 8/2003 | Newman ................ | 345/593 |
| 6,603,879 B2 * | 8/2003 | Haikin et al. ........... | 382/167 |
| 6,642,931 B1 * | 11/2003 | Haikin et al. ........... | 345/601 |
| 6,681,041 B1 | 1/2004 | Stokes et al. ........... | 382/164 |
| 6,704,442 B2 * | 3/2004 | Haikin et al. ........... | 382/162 |
| 6,762,858 B2 * | 7/2004 | Haro .................... | 358/1.9 |
| 6,836,345 B1 * | 12/2004 | Setchell ................ | 358/1.9 |
| 6,850,342 B2 | 2/2005 | Woolfe et al. ........... | 358/1.9 |
| 6,922,266 B2 * | 7/2005 | Hiramatsu ............. | 358/518 |
| 6,978,043 B1 * | 12/2005 | Haikin et al. ........... | 382/167 |
| 7,106,474 B1 * | 9/2006 | Haikin et al. ........... | 358/1.9 |
| 7,355,745 B2 * | 4/2008 | Hudson et al. .......... | 358/1.9 |
| 7,356,181 B2 * | 4/2008 | Haikin et al. ........... | 382/167 |
| 7,379,208 B2 * | 5/2008 | Henley et al. .......... | 358/1.9 |
| 7,420,706 B2 * | 9/2008 | Tin .................... | 358/1.9 |
| 7,456,997 B2 * | 11/2008 | Pethania et al. ........ | 358/1.9 |

(Continued)

OTHER PUBLICATIONS

Littlewood, D.J. et al., "Pareto-Optimal Formulations for Cost versus Colorimetric Accuracy Trade-Offs in Printer Color Management," ACM Transactions on Graphics, vol. 21, No. 2, Apr. 2002, pp. 132-175.

*Primary Examiner*—Mark K Zimmerman
*Assistant Examiner*—Dung D Tran
(74) *Attorney, Agent, or Firm*—Fitzpatrick, Cella, Harper & Scinto

(57) ABSTRACT

A method and apparatus for generating transform-based color profiles by a measurement-based Color Management System (CMS). The measurement-based CMS generates the transform-based profile wherein the measurement-based color system is parameterized by color data and procedures. The CMS may use a reference Profile Connection Space (PCS) loaded from a measurement profile, thus enabling user configuration of the generation process. The reference PCS may also be set to include a gamut that is appropriate for an eventual color-output device. In addition, a Gamut Mapping Model (GMM) used in the generation process is user-selectable as well as a Device Model (DM). The DM may also be supplied as a pluggable module. The CMS also features user-selectable mapping from an International Color Consortium (ICC) intent to a PCS profile and to a DM. The features of the CMS may be used in an application, stand-alone profiling tool or in an operating system utility.

9 Claims, 9 Drawing Sheets

U.S. PATENT DOCUMENTS

| | | | |
|---|---|---|---|
| 7,483,170 B2 * | 1/2009 | Haikin | 358/1.9 |
| 7,505,625 B2 * | 3/2009 | Haikin | 382/167 |
| 7,619,773 B2 * | 11/2009 | Haikin et al. | 358/1.9 |
| 2002/0122589 A1 | 9/2002 | Reiman et al. | 382/167 |
| 2002/0124027 A1 | 9/2002 | Krueger et al. | 707/528 |
| 2003/0053134 A1 * | 3/2003 | Haro | 358/2.1 |
| 2003/0123072 A1 | 7/2003 | Spronk | 358/1.9 |
| 2004/0239965 A1 | 12/2004 | Krueger et al. | 358/1.9 |
| 2005/0024430 A1 * | 2/2005 | Kress | 347/43 |
| 2005/0105106 A1 * | 5/2005 | Haikin | 358/1.9 |
| 2005/0249403 A1 * | 11/2005 | Haikin | 382/162 |

* cited by examiner

CREATION OF TRANSFORM-BASED PROFILES BY A MEASUREMENT-BASED COLOR MANAGEMENT SYSTEM

BACKGROUND

1. Field of the Invention

The present invention relates generally to Color Management Systems (CMSs) and more particularly, to measurement-based CMSs that can generate transform-based profiles either automatically or under user control.

2. Description of the Related Art

Today, there are many software profile-building tools that convert colorimetric measurement data into an International Color Consortium (ICC) device profile. Most of these tools directly control various measuring devices, such as calorimeters, spectrophotometers, and spectroradiometers, to capture the colorimetric data. The better tools offer some controls to let users control some aspects of black-generation, under color removal, and similar areas that address the many-to-one relationship between device control values and colorimetry. Some tools even offer the option of directly manipulating the one dimensional lookup tables, multi-dimensional lookup tables, and matrices in the resultant ICC device profile.

It is also a common feature of these systems that the calorimetric measurements may be stored in a data file. Often, these measurements are stored in a standard file format like the CGATS IT8.7 series of file formats.

The profile-building tools referred to above are used to create transform-based profiles that work in transform-based Color Management Modules (CMMs). A transform-based CMM makes use of an internal Profile Connection Space (PCS) that has a colorimetrically-defined color space volume. The viewing conditions of the PCS are strictly defined. This allows the PCS values to represent a known appearance.

The ICC discovered that it was important that the PCS also have a limited volume. If a printer device model, for example, had to map all possible color appearance values to fit within the gamut of the printer, then the gamut of color appearance values produced by typical source devices ends up over-compressed. In order to overcome this problem, the ICC has defined a reference PCS gamut. Earlier, the definition of the PCS gamut was determined by individual vendors, who often did not publish the characteristics of this gamut. Colors within the PCS reference gamut occupy most or all of the printer's gamut. Colors outside the reference PCS gamut are either clipped or compressed into a narrow range of the printer's gamut. Note that similar compression may be necessary for input devices with a gamut that extends outside the PCS reference gamut. One example is the gamut of a monitor. The light green of the green primary is outside the typical PCS reference gamut and so must be compressed.

ICC profiles are called transform-based profiles because mapping between the source colorimetry in the source viewing conditions to the volume of the PCS in the PCS viewing conditions, which requires a significant amount of processing and often requires certain aesthetic decisions as well, is performed by the profile building software and is stored in the profile in the form of a pre-computed transform. There are several steps involved in computing this transform. First, the source device values must be converted into colorimetry—a process called "device modeling." Next, the source colorimetry and source viewing conditions are used to create color appearance values in a color appearance space. If some of the original color appearance does not fit within the PCS gamut, then some sort of gamut mapping will be needed. Many different Gamut Mapping Algorithms (GMAs) are known; it is an aesthetic decision which one to use. This mapping from source device space to the PCS gamut is called an AToB mapping. Once the mapping has been determined, the profile-building application creates a multidimensional lookup table (LUT). Using the LUT, a CMM can map from device control value to PCS value using simple table lookup and interpolation techniques. All the complex calculations took place when the LUT was created. A similar mapping, called a BToA mapping, is required to obtain device control values for an output device from PCS values.

ICC users have long requested that suppliers of CMSs move from the "Smart profile/dumb CMM" model to a "Dumb Profile/Smart CMM" model, that is, from a transform-based architecture to a measurement-based one. In a measurement-based model, the profiles contain only the colorimetric measurements themselves and the computation of the color transformation is performed by the CMS. U.S. Pat. No. 6,603,483 describes such an architecture. Such measurement-based profiles are much easier for users to validate and, if necessary, modify.

It may be the case in a networked computer environment that there are computers where the operating system supports a transform-based CMS and computers where the operating system supports a measurement-based CMS. A system based on measurement profiles may need to print to a networked printer. If that printer either is on an operating system using transform-based profiles or if the printer directly supports transform-based profiles, then there may be a need to provide a transform-based profile that has equivalent behavior to the color management transformation obtained from the measurement-based profile in a measurement-based CMS.

In the case above, if the destination machine (printer or networked computer) does not validate profiles, there is no need to create a completely conformant transform-based profile, since only one of the two transforms (AtoB or BtoA) is needed. However, profile building software will always build both transforms. Thus, it may be desirable to be able to create only the needed elements of the transform-based profile from the measurements.

One approach would be to use the measurements as input to a typical ICC profile builder. There are several possible problems with this approach. First, it may be important to perform this conversion in an automated system without requiring user intervention. Second, the measurement-based profiles may not contain the specific measurement values needed for the profile builder. Third, it is desirable to provide users with as much consistency with the measurement-based CMS as possible. Fourth, it would be advantageous to use the device-specific expertise that hardware vendors use in creating device model plug-ins for the measurement-based CMS. It is also desirable that the solution be able to avoid the limitations of the print-centric ICC PCS. (By "print-centric," it is meant that the PCS gamut is shaped like that of a typical ink-jet printer, with the most chromatic values being dark. When transforming between two video displays, the print-centric gamut requires clipping colors to the PCS gamut that are actually within the gamut of both the source and destination devices.)

In the networked environment described above, it may be desirable to obtain color results that are as consistent as possible across all the computers, regardless of how their CMS works. This is difficult to achieve when some profiles are measurement-based and the intelligence is in the CMM and other profiles are transformed-based, with the intelligence in the profile builder.

Therefore, a need exists for a CMS that is capable of generating transform-based profiles from measurement-based profiles. The CMS should be capable of using as much device-specific information as is available to the CMS and the generation process should be capable of being automated. Various aspects of the present invention meet such a need.

SUMMARY OF THE INVENTION

A method and apparatus for generating transform-based color profiles by a measurement-based Color Management System (CMS) is provided. The measurement-based CMS generates the transform-based profile wherein the measurement-based color system is parameterized by color data and procedures. The CMS may use a reference Profile Connection Space (PCS) loaded from a measurement profile, thus enabling user configuration of the generation process. The reference PCS may also be set to include a gamut that is appropriate for an eventual color-output device. In addition, a Gamut Mapping Model (GMM) used in the generation process is user-selectable as well as a Device Model (DM). The DM may also be supplied as a pluggable module. The CMS also features user-selectable mapping from an International Color Consortium (ICC) intent to a PCS profile and to a DM. The features of the CMS may be used in a stand-alone profiling tool or in an operating system utility.

In one aspect of the invention, a measurement-based CMS generates a transform-based profile for a transform-based CMS using parameterized color data and procedures.

In another aspect of the invention, a first transform is created using a device model, a gamut mapping model, and a profile connection space device model. An AtoB look-up-table is generated using a sampling of a device space and the first transform.

In another aspect of the invention, the device model is initialized using data in a device model profile. Colorimetric data is then obtained using device color data and the device model and appearance data is created from the colorimetric data using a color appearance. A device gamut boundary used to initialize the gamut mapping model is then generated using the appearance data.

In another aspect of the invention, the device color data is a sampling of data from the device model profile.

In another aspect of the invention, the device color data is a full sampling of a device color space.

In another aspect of the invention, the profile connection space device model is initialized using data in a profile connection space profile. Colorimetric data is obtained using the profile connection space device model. Appearance data is then created from the calorimetric data using a color appearance model and a profile connection space gamut boundary used to initialize the gamut mapping model is generated using the appearance data.

In another aspect of the invention, a second transform is created using a device model, a gamut mapping model, and a profile connection space device model with a BtoA look-up-table generated using a sampling of a profile connection space and the second transform.

In another aspect of the invention, the AToB LUT is included in a transform-based profile for a source device, the transform-based profile for use in a transform-based CMM.

In another aspect of the invention, the BtoA is included in transform-based profile for a destination device, the transform-based profile for use by a transform-based CMM.

In another aspect of the invention, the measurement-based CMS generates only a portion of the transform-based profile based on a determination of the requirements of a specific transform-based CMS.

In another aspect of the invention, creation of the transform-based profile is controlled by an automated workflow with no user intervention required.

In another aspect of the invention, creation of the transform-based profile is controlled by user specifications.

In another aspect of the invention, a transform-based profile for a transform-based color management system is generated within an application parameterized by color data and procedures using at least one procedure that is selectable and pluggable by a user.

In another aspect of the invention, a transform-based color management module is customized for use with a specified color output device by providing user-selectable mappings from the International Color Consortium intent to a profile connection space profile and a device model. A profile connection space device model is then generated using the profile connection space profile. A first transform is created using the device model, a gamut mapping model, and the profile connection space device model. Finally, an AtoB look-up-table is generated for use in the transform-based color management module using a sampling of a device space and the first transform.

In another aspect of the invention, customizing the transform-based color management module further includes creating a second transform using the device model, the gamut mapping model, and the profile connection space device mode and generating a BtoA look-up-table for use in the transform-based color management module using a sampling of a profile connection space and the second transform.

DETAILED DESCRIPTION

Figure 1:
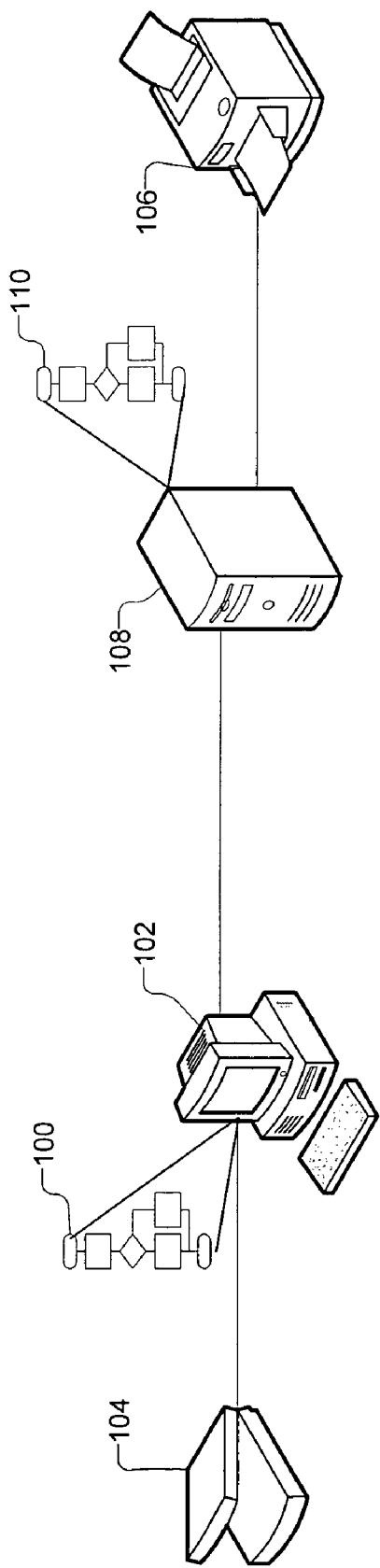
FIG. 1 is a deployment diagram depicting the use of a measurement-based CMM that is part of a measurement-based CMS in an environment wherein some devices use transform-based CMMs from a transform-based CMS in accordance with an exemplary embodiment of the present invention.

FIG. 1 is a deployment diagram depicting the use of a measurement-based CMM that is part of a measurement-based CMS in an environment wherein some devices use transform-based CMMs in accordance with an exemplary embodiment of the present invention. A measurement-based CMM 100, which is part of a measurement-based CMS, is hosted by a data processing system, such as computer 102. The computer may be coupled to a color source device, such as scanner 104, from which the computer receives data including color values for processing.

The computer may also be coupled to another data processing system, such as printer server 108, hosting a transform-based CMM 110. The printer server may be coupled to a destination color device, such as color printer 106.

In operation, the computer transmits data in the form of color values, such as color image data, to the printer server for printing on the color printer. The data may come from the scanner or may come from some other datastore on the computer such as a color image stored in a file. In order to print the data on the color printer, the server must process the color values using the transform-based CMM. To do so, the transform-based CMM requires that transform-based profiles be made available for both the source color device and the destination color device. As the server has a transform-based CMM and is receiving the data for printing from the computer, the server may require the computer to send at least a transform-based profile for the source color device associated with the data for printing. In addition, the server may rely on the computer to supply the server with transform-based profiles for the destination color device.

Figure 2:
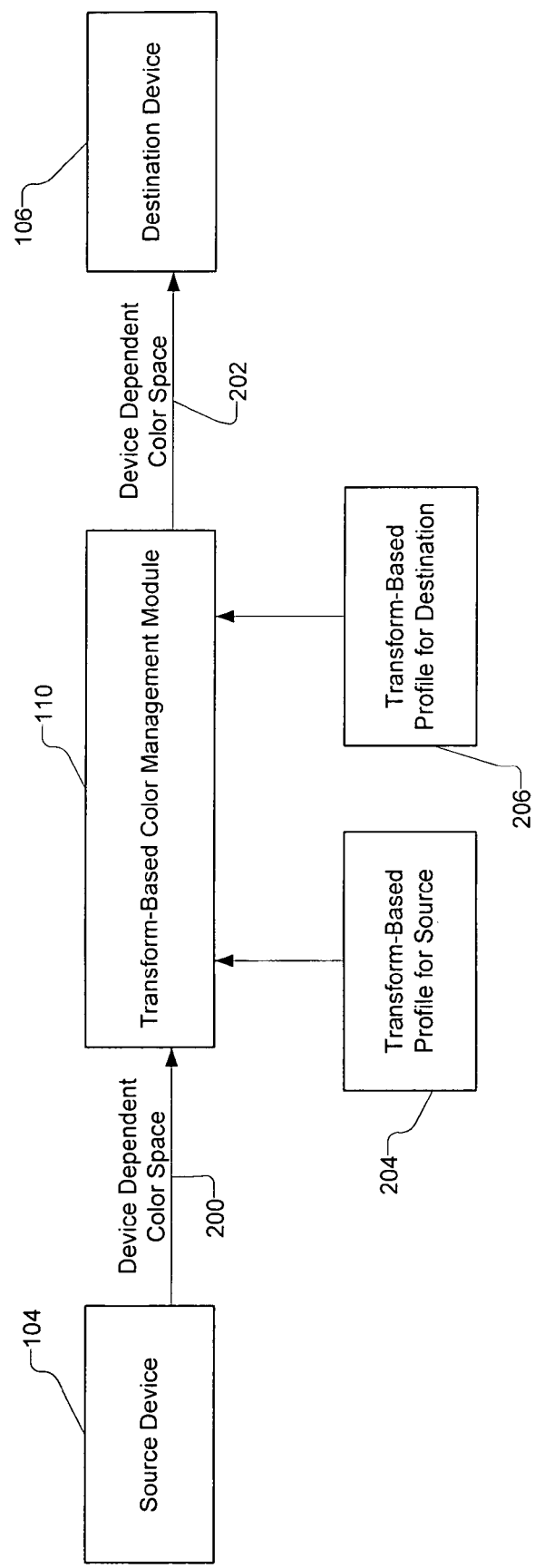
FIG. 2 is a block diagram depicting the operation of a transform-based CMM that is a part of a transform-based CMS in accordance with an exemplary embodiment of the present invention.

In slightly more detail than FIG. 1, FIG. 2 depicts in a block diagram the operation of transform-based CMM 110 in accordance with an exemplary embodiment of the present invention. The CMM receives color values 200 from a source device 104 in a source device-dependent color space. For example, the source device may generate color values for image data using Red Green Blue (RGB) color values. The CMM receives the color values from the source device and generates color values 202 in a destination device-dependent color space for use by a destination device 106. To do so, the CMM utilizes a color transform found in transform-based source profile 204. Such source profiles are also often called color profiles or device profiles. In transform-based CMMs, the color transforms in a transform-based profile are used to transform device-dependent color values into device-independent color values defined by either Commission Internationale de l'Enclairage (CEE) XYZ under a D50 illuminant at an illumination level of 500 lux or CEELab under the same viewing conditions. The device-independent color space is also known as the profile connection space (PCS). Once the source device's color values have been converted to color values PCS, the CMM can then utilize a transform-based destination profile 206 to transform the color values from the PCS to a destination device-dependent color space.

Figure 3:
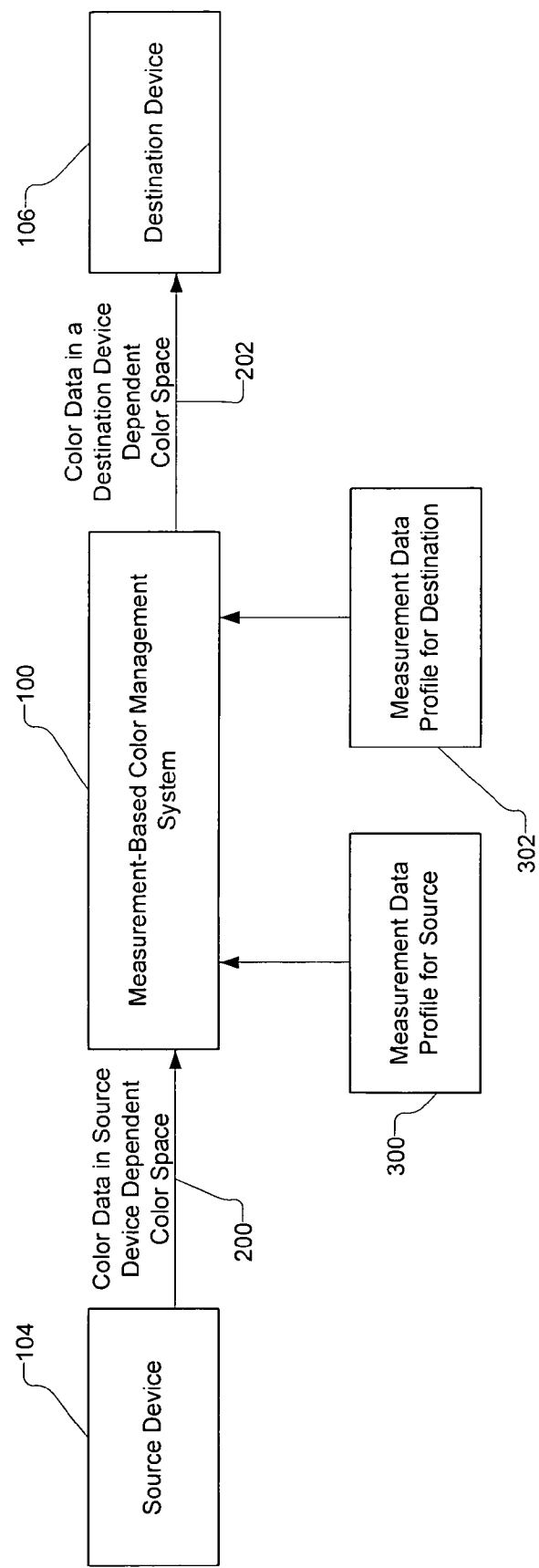
FIG. 3 is a block diagram depicting the operation of a measurement-based CMM that is part of a measurement-based CMS in accordance with an exemplary embodiment of the present invention.

In slightly more detail than FIG. 1, FIG. 3 depicts in a block diagram the operation of a measurement-based CMM 100 in accordance with an exemplary embodiment of the present invention. Instead of utilizing color transforms in device profiles to convert color values 200 in a source device-dependent color space to color values 202 in a destination device-independent space, the measurement-based CMM utilizes color measurement data for the source device and color measurement data for the destination device. This measurement data is contained in source measurement data profile 300 and in destination measurement data profile 302.

In operation, the measurement-based CMM constructs a model with the measurement data to map colors from a source device 104 to a device-independent, color appearance space with no imposed gamut limitations. This model is often called a color appearance-based transform. Using a similar technique, the measurement-based CMM maps the colors of the device-independent color appearance space to corresponding destination device values for a destination device 106. Typically, the measurement data is obtained by measuring the output of a device with a colorimeter, spectrophotometer, or spectroradiometer. The measurement data used by a measurement-based color management system is in a scaled CIEXYZ format.

Figure 4:
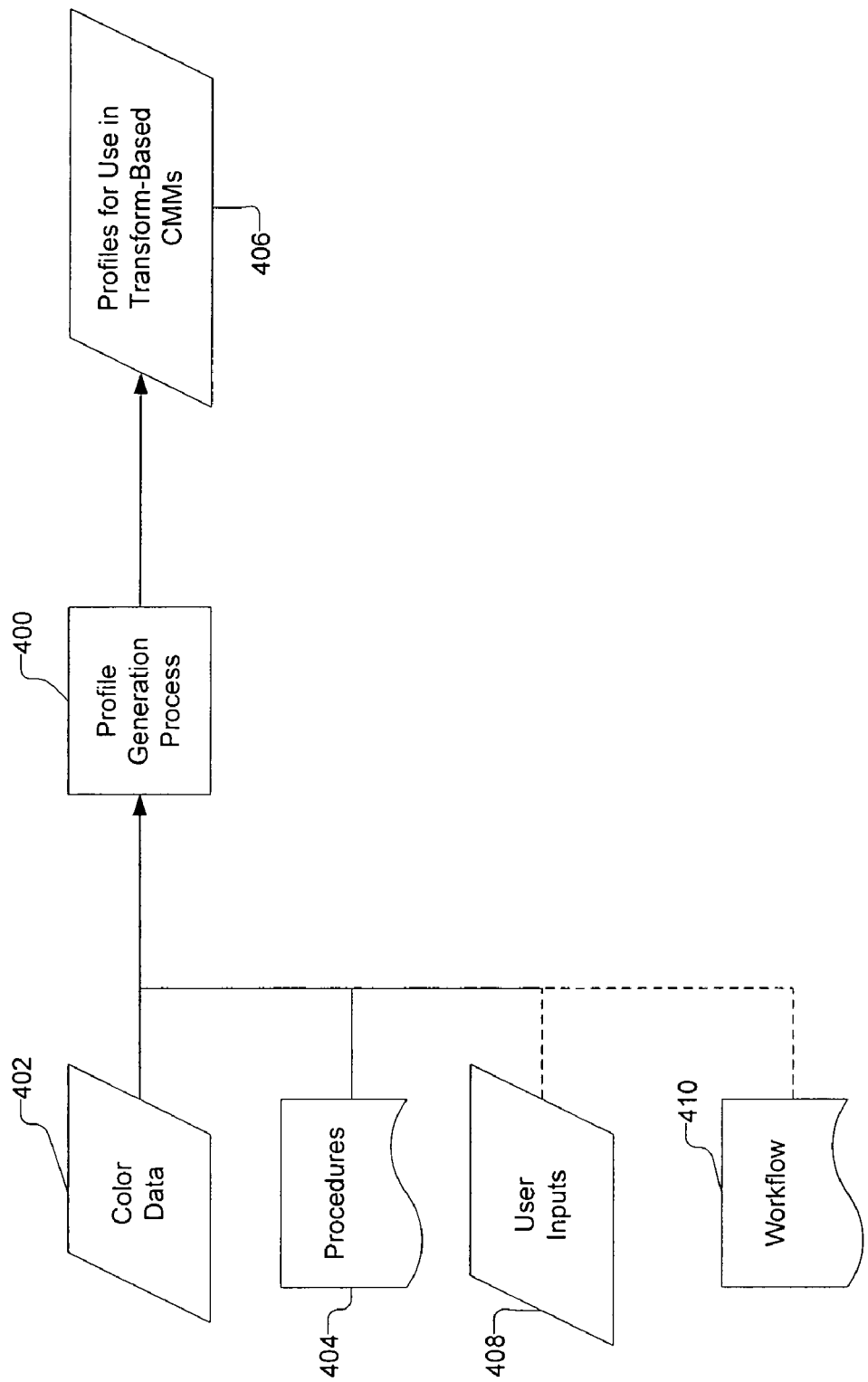
FIG. 4 is a block diagram depicting the operation of transform-based profile generation process in a measurement-based CMM in accordance with an exemplary embodiment of the present invention.

As illustrated in FIG. 1, using a measurement-based CMM in conjunction with a transform-based CMM may result in incompatibility problems as the transform-based CMM may be relying on the measurement-based CMM to supply transform-based profiles. FIG. 4 is a process flow diagram of a transform-based profile generation process that may be used within the context of a measurement-based CMS in accordance with an exemplary embodiment of the present invention. A transform-based profile generation process 400 may be added to a measurement-based CMM 100 in order for the measurement-based CMM to communicate with a transform-based CMM 110 (both of FIG. 1). The transform-based profile generation process receives as inputs color data 402 and procedures 404 that parameterize a measurement-based color system. The transform-based profile generation process uses the color data and procedures to generate a transform-based profile 406 for a transform-based color management system.

Depending on the intended use, the transform-based profile generation process may be implemented as a system utility library or as a stand-alone application. A system utility library requiring no manual intervention is particularly useful to address the desire to print from an operating system using measurement-based profiles to a computer or printer using transform-based profiles. As a system utility library, all selectable parameters are selected by the operating system or a programmer whose code calls the operating system utility. In addition, the measurement-based CMS could still support plug-ins for modeling certain devices or implementing certain gamut mapping algorithms.

A standalone profile building application would address the desire for consistent results between the measurement-based CMS and the transform-based CMS. In this implementation, the measurement-based CMS is used to construct a profile for the transform-based CMS. In this way, consistent device modeling and gamut mapping between the two systems would be achieved. Furthermore, the device modeling can be done using plug-ins provided by the hardware vendors who best understand the behavior of their devices.

To facilitate different types of implementations, the operations of the transform-based profile generation process may be controlled in various ways depending on the type of implementation. For example, the transform-based profile generation process may operate under the control of user inputs 408. These inputs may be a configuration specified by the user in order to turn on and off certain features of the transform-based profile generation process. The user may also specify which color data or procedures the transform-based profile generation process uses by supplying software modules in the form of plug-ins or the like. This flexibility is useful in situations were a user has a specific idea about how they want a transform to be created.

In addition, a transform-based profile generation process may be controlled through the operation of a workflow 410 that specifies how the transform-based profile generation process is to operate. This feature is useful for automating a transform-based profile generation process in order to hide the implementation features from a user, thus making the transform-based profile generation process user-transparent.

By using either workflows or user inputs, the transform-based profile generation process may be incorporated into various types of software objects. For example, the transform-based profile generation process may be included in a measurement-based CMM in order to add compatibility with a transform-based CMM. The transform-based profile generation process may also be incorporated into an operating system of a computer system such that the transform-based profile generation process is accessible to a variety of software objects. In operation, a software object may supply as inputs to the transform-based profile generation process the color data and procedures along with a workflow in order to generate the desired transform-based profiles. A transform-based profile generation process may also be used in a stand-alone application used by a user to generate profiles to the user's specifications in order to customize a color input or output device. For example, a transform-based profile generation process included in a stand-alone application may used to generate transform-based profiles for a specific color device, such as a color monitor, so that colors displayed on a monitor depict how the colors may appear on another surface, such as painted metal.

Figure 5:
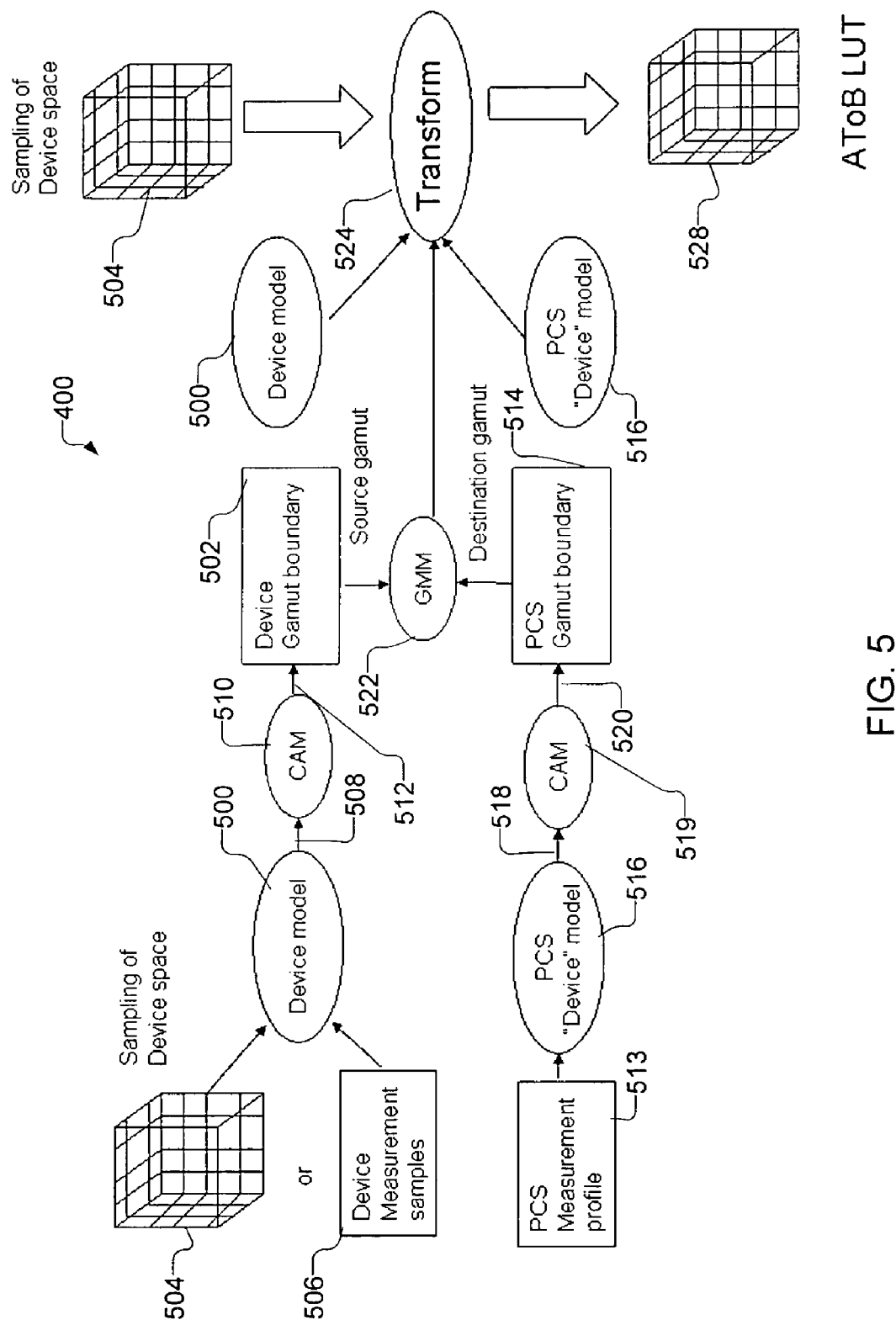
FIG. 5 is a process flow diagram of a portion of a transform-based profile generation process in accordance with an exemplary embodiment of the present invention.

FIG. 5 is a process flow diagram of a portion of a transform-based profile generation process in accordance with an exemplary embodiment of the present invention. A transform-based profile generation process 400 initializes a device model 500 using data from a measurement-based device model profile and its associated viewing condition. As the device model is part of the measurement-based device model profile, the device model can convert device model color values to colorimetry and vice versa. This device model may either be a plug-in or part of a CMS.

The transform-based profile generation process then generates a device gamut boundary 502 as follows. Either a sampling of data 504 from the device model profile or a full sampling of the device color space 506 is run through the device model to obtain device colorimetric data 506. The device calorimetric data is run through a Color Appearance Model (CAM) 510 to create appearance data 512. CAM 510 is an instance of a color appearance model element that has been initialized with a set of parameters. For preparation of the device gamut boundary, the parameters represent the conditions under which the source image is viewed. The appearance data is then used to create the device gamut boundary. Construction of the gamut boundary may be accomplished in various ways. A one method is to construct a three-dimensional mesh representing the convex hull of the data points.

Next the transform-based profile generation process uses data from a reference PCS measurement profile 513 to create a gamut boundary 514 for the PCS. As described below, mapping from a device space to a PCS is fundamentally like a color management process used in a measurement-based CMM to map from a device space to another device space. To process the PCS, reference viewing conditions for the PCS are used as specified in standards such as the ICC profile format specification. The information provided in the ICC profile format specification is sufficient to compute all the data needed to initialize CAM 510. For consistency and flexibility, this information may be stored in a measurement-based color profile.

The measurement-based color profile may also be used to store samples that define the reference gamut of the PCS. A transform-based profile generation process as described above has two ways to create gamut boundaries. One way is to sample the complete device space and use the device model to create measurement values. A second way is to use measured samples from the PCS profile to create a reference gamut boundary. While both methods may work, use of measured samples may be more computationally manageable. Note that this profile-based approach is flexible. If it is desired to redefine the reference PCS gamut, all one has to do is change the measurement data in the PCS device profile.

The ICC PCS is a modeling of an ideal device. By creating a PCS "device" model 516 of the PCS and using it as a model of a real device, the transform-based profile generation process can take advantage of the color management processes used in the measurement-based CMM. Creating a device model from colorimetry to the PCS encoding is straightforward. The transform-based profile generation process maps between the true colorimetric values and the PCS encoded values. Since the CMS interface for device models may only support XYZ color values in the XYZ color space, the transform-based profile generation process may also have to map between the XYZ color space and the LAB color space. This is a well-known transformation.

Once the PCS device model is initialized, color data from the PCS measurement profile is run through the device model to obtain PCS calorimetric data 518. The PCS colorimetric data is then run through CAM 519 to create PCS appearance data 520. CAM 519 is an instance of a color appearance model element that has been initialized with a set of parameters. For preparation of the PCS gamut boundary, the parameters represent the conditions specified for the PCS, namely, D50 under 500 Lux. The PCS appearance data is then used to create the PCS gamut boundary The transform-based profile generation process uses the device gamut boundary and the PCS gamut boundary to initialize a Gamut Mapping Model (GMM) 522. The transform-based profile generation process uses the device model, the GMM, and the PCS device model to create a transform 524. The transform-based profile generation process then transforms sampling of device space 504 to create an AToB LUT 528.

Figure 6:
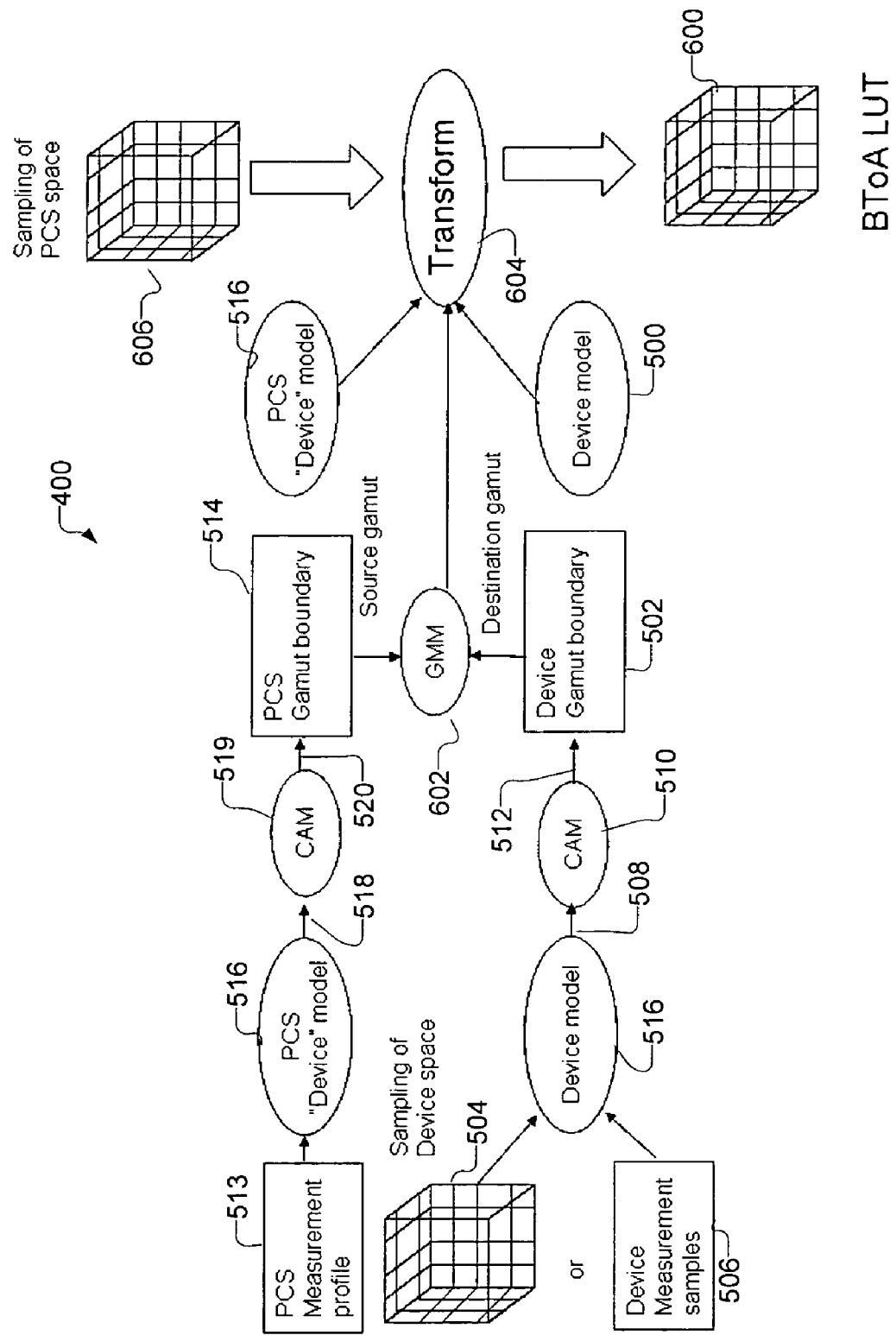
FIG. 6 is a process flow diagram of another portion of a transform-based profile generation process in accordance with an exemplary embodiment of the present invention.

FIG. 6 is a process flow diagram of another portion of a transform-based profile generation process in accordance with an exemplary embodiment of the present invention. FIG. 6 illustrates the creation of a BToA LUT 600. This is almost identical, with the roles of source and destination exchanged. Also, the full PCS gamut is sampled to create the LUT.

In order to generate BToA LUT 600, transform-based profile generation process 400 initializes a device model 500 using data from a measurement-based device model profile and its associated viewing condition. The transform-based profile generation process then generates a device gamut boundary 502 as follows. Either a sampling of data 504 from the device model profile or a full sampling of the device color space 506 is run through the device model to obtain device calorimetric data 506. The device colorimetric data is then run through a Color Appearance Model (CAM) 510 to create appearance data 512. The appearance data is then used to create the device gamut boundary.

Next the transform-based profile generation process uses data from a reference PCS measurement profile 513 to create a gamut boundary 514 for the PCS.

Once a PCS device model 516 is initialized, color data from the PCS measurement profile is run through the PCS device model to obtain PCS colorimetric data 506. The PCS colorimetric data is then run through CAM 510 to create PCS appearance data 520. The PCS appearance data is then used to create the PCS gamut boundary The transform-based profile generation process uses the device gamut boundary and the PCS gamut boundary to initialize a Gamut Mapping Model (GMM) 602. The transform-based profile generation process uses the device model, the GMM, and the PCS device model to create a transform 604. The transform-based profile generation process then transforms sampling of PCS space 606 to create BToA LUT 600.

Referring again to FIG. 2, once the transform-based generation process finishes the generation of AToB LUT 528 (of FIG. 5) or BToA LUT 600 (of FIG. 6), the LUTs may be included in a transform-based profile for use by transform-based CMM 110. Specifically, the AToB LUT is included in transform-based profile 204 for source device 104 and the BToA LUT 600 is included in transform-based profile 206 for destination device 106.

In another aspect of the invention, the transform-based profile generation process may be used to generate customized transform-based profiles using user modified PCSs. As an example, the ICC found that one PCS was not sufficiently flexible to meet all the intended uses of a CMS. So, in version 4 of the Profile Specification, the ICC clarified that there are actually two PCS encodings. One is used for the colorimetric intents, another is used for the perceptual intent. (No PCS is specified for the Saturation intent. The ICC has left this part ambiguous.) The colorimetric PCS has a minimum and maximum lightness specified, but the chroma and hue values range to roughly ±127. Thus, this PCS looks like a rectangular prism. As mentioned above, the perceptual PCS volume resembles the gamut of an inkjet printer.

The two ICC PCSs also have two different digital encodings. In the perceptual PCS, a value of zero represents a lightness of zero. In the calorimetric PCS, a value of zero represents the minimum lightness of the PCS, which is greater than zero. This problem can be solved by having a different device model for each of the PCS encodings.

Figure 7:
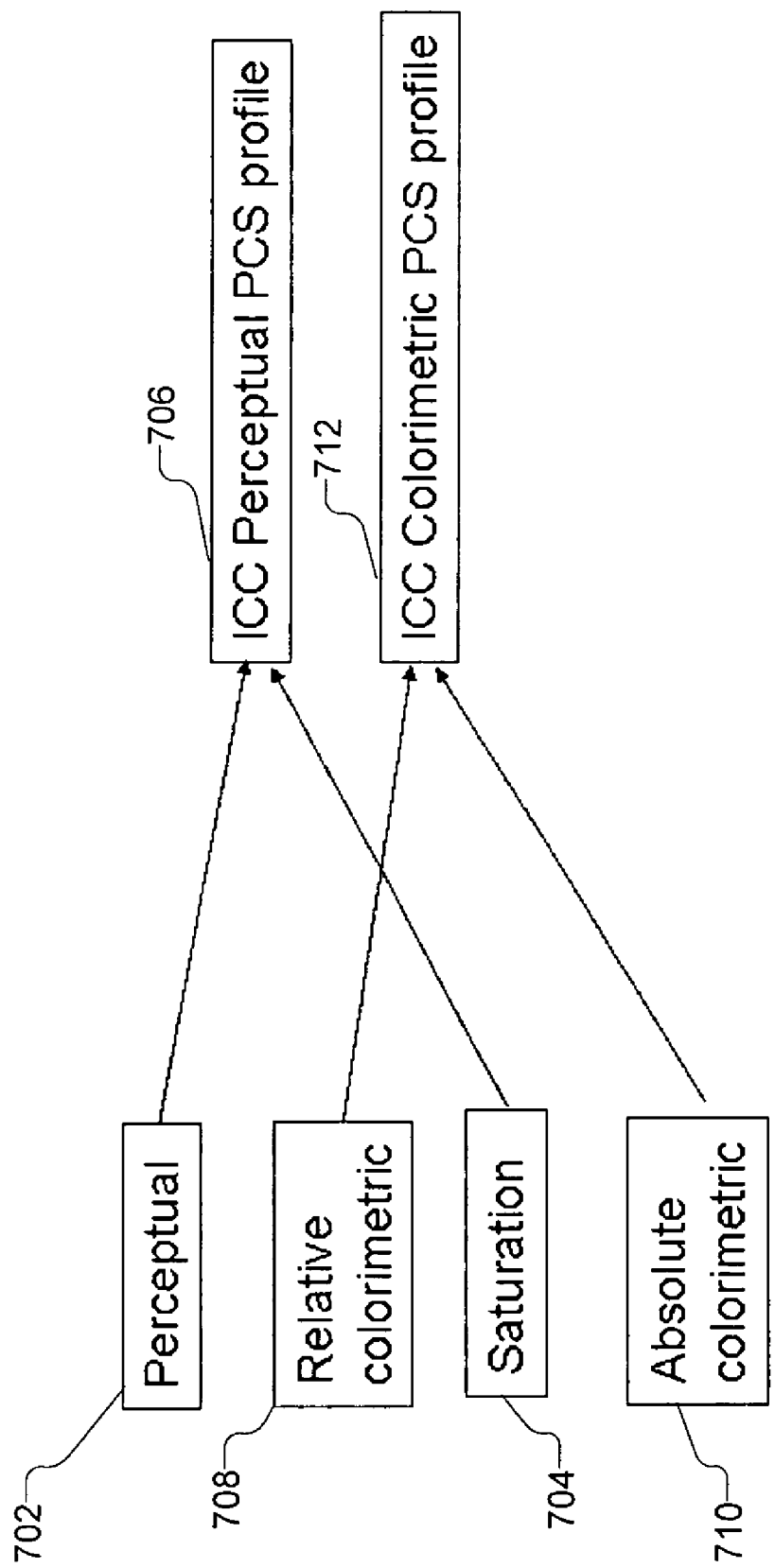
FIG. 7 is a block diagram illustrating the selection of a mapping from the ICC intent to a PCS profile in accordance with an exemplary embodiment of the present invention.

The present invention features a user-selectable mapping from the ICC intent to a PCS profile and a user-selectable mapping from the ICC intent to a device model. FIG. 7 is a block diagram illustrating the selection of a mapping from the ICC intent to PCS profile. Perceptual intent data 702 and saturation intent data are mapped into an ICC perceptual intent profile 706. In addition, relative calorimetric intent data 708 and absolute calorimetric intent data 710 can be mapped into an ICC colorimetric PCS profile 712.

Figure 8:
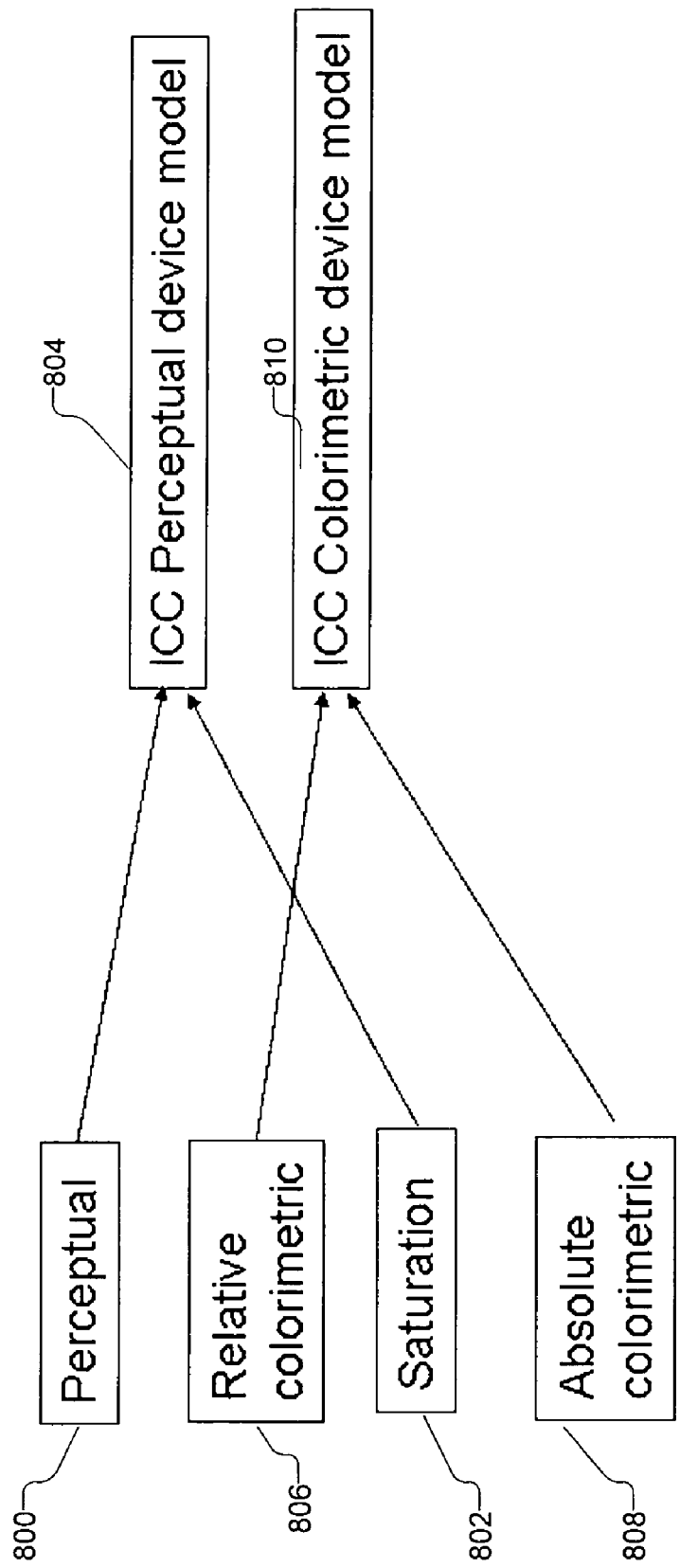
FIG. 8 is a block diagram illustrating the selection of a mapping from the ICC intent to a device model in accordance with an exemplary embodiment of the present invention.

FIG. 8 illustrates mapping of intent to a device model. Perceptual intent data 800 and saturation intent data 802 are mapped to an ICC perceptual device model 804. Relative calorimetric intent data 806 and absolute colorimetric intent data 808 may be mapped to an ICC colorimetric device model.

In addition, if the gamut of the device is larger than the gamut of the PCS, then user-selectable Gamut Mapping Algorithms (GMAs) may be used to map from the device gamut to the PCS gamut. Alternatively, a measurement-based CMS may provide a set of default GMAs, with a default mapping from the four ICC intents to the GMAs. In the measurement-based CMM described above, the GMAs may be implemented either by baseline GMMs or by plug-in GMMs.

To create the AToB LUTs for an ICC profile, a transform-based profile generation process maps from a source device's gamut to that of an appropriate PCS. To create the BToA LUTs, the transform-based profile generation process maps from the PCS space to the destination device's gamut. The mapping for the AToB LUTs is quite similar to that used in measurement-based CMS. For the perceptual PCS, the transform-based profile generation process maps the device's plausible gamut to the perceptual PCS gamut boundary, using either clipping or compression for any out of gamut colors. For the colorimetric intents, the transform-based profile generation process may have to clip lightness, but the chroma and hue values will all fit in the colorimetric PCS gamut.

The mapping for the BToA LUTs is a little different. The calorimetric intents are still handled easily; the transform-based profile generation process just clips PCS values to the gamut of the destination device. But the ICC requires that all possible PCS values map to some device value, not merely those within the reference gamut of the perceptual PCS. So the transform-based profile generation process ensures that the GMMs can handle source colors that are outside the reference gamut. In one embodiment of a transform-based profile generation process, this is handled by clipping those colors to the device's gamut boundary. In another embodiment of a transform-based profile generation process, the reference PCS gamut is mapped to a color volume within the device's gamut boundary and then the transform-based profile generation process compresses the source colors outside the reference PCS gamut into the rest of the device's gamut.

In some instances, it may be determined that the transform-based profile generation process is creating an ICC profile to be consumed by a specific CMM, such as a CMM installed on a specific printer. If it is known that the specific CMM does not perform profile validation, then the transform-based profile generation process can optimize itself by only supplying the portion of the profile, such as specific tags, that will actually be used by the CMM. For example, if the transform-based profile generation process is creating an ICC profile for embedding in an image, only the AToB LUTs will be used, so the transform-based profile generation process does not have to generate the BToA LUTs. Further more, if the transform-based profile generation process knows enough about the CMM and the application being used to render the image on the output device, the transform-based profile generation process may know the specific tag that will be used from the profile. In that case, the transform-based profile generation process need only generate that specific tag. The other LUTs may either be left empty or "dummy" values may be created. These are the smallest possible tag values that will produce a profile acceptable to the destination device.

In another embodiment of the invention, transform-based profile generation process is used as a generator pipeline to create an ICC profile builder. The advantages of using this pipeline are that the process would be as consistent as possible to the behavior of a measurement-based CMS, while still supporting the ICC.

Because these embodiments use the measurement-based CMS's device models, it is assured that the transform-based profile generation process can build an ICC profile starting from any measurement-based profile accepted by the CMS. Note that this also means that the transform-based profile generation process will use any extension data that may have been added to the measurement profile and understood by proprietary plug-in device models.

The explanation above was provided in terms of the ICC and its specific PCS. But there is nothing in the approach that is limited to the ICC PCS. By specifying a different profile or profiles for the device data and viewing conditions, it is possible to modify the reference PCS used in the present invention.

Figure 9:
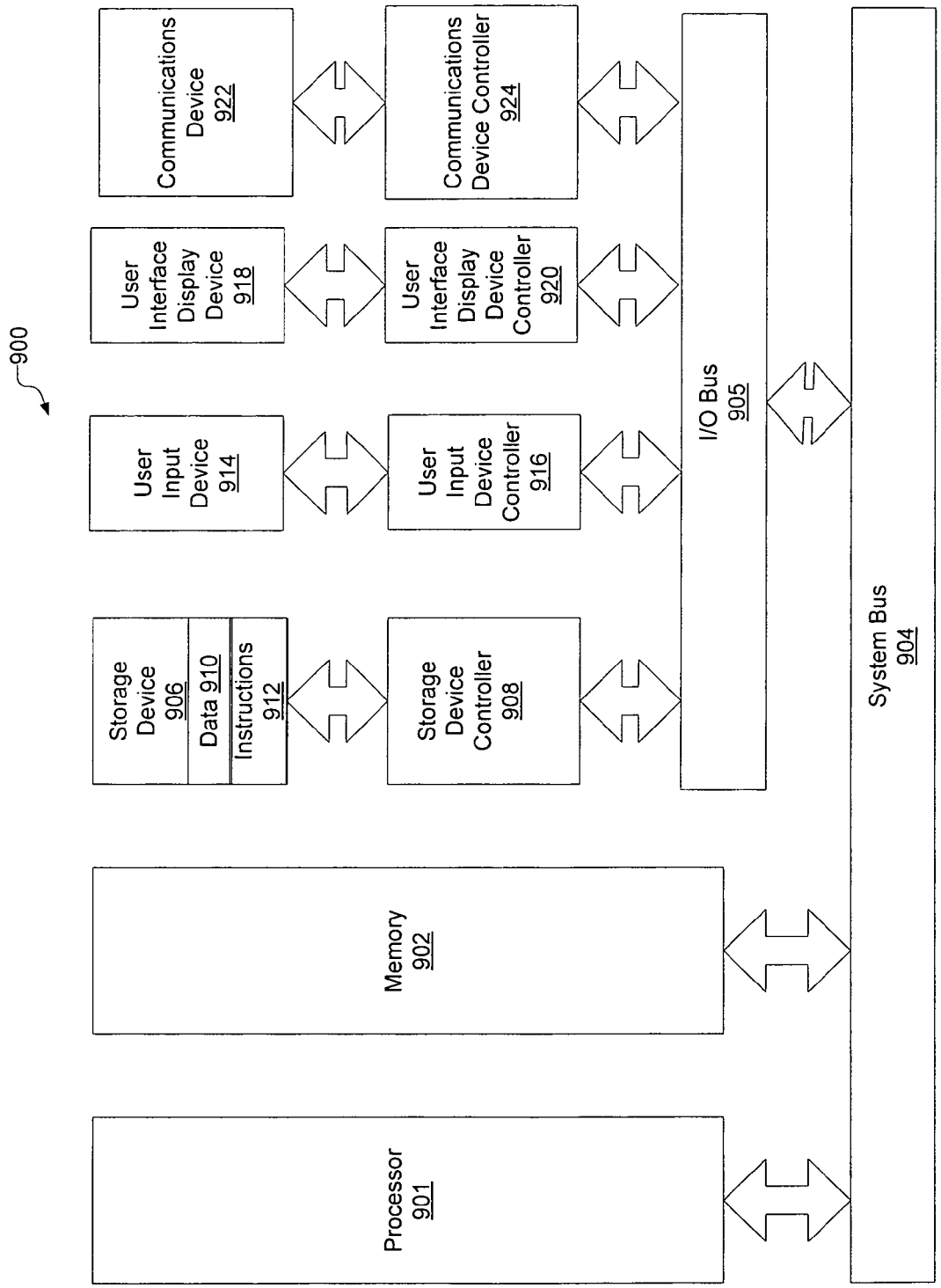
FIG. 9 is an architecture diagram for a data processing apparatus, such as a general purpose computing machine, suitable for hosting a transform-based profile generation process in accordance with an exemplary embodiment of the present invention.

FIG. 9 is an architecture diagram for a data processing apparatus, such as a general purpose computing machine, suitable for hosting a transform-based profile generation process in accordance with an exemplary embodiment of the present invention. The data processing apparatus 900 includes a processor 901 coupled to a memory 902 via system bus 904. The processor is also coupled to external Input/Output (I/O) devices via the system bus and an I/O bus 905. A storage device having computer system readable media 906 is coupled to the processor via a storage device controller 908 and the I/O bus and the system bus. The storage device is used by the processor to store and read data 910 and program instructions 912 used to implement the features of a transform-based profile generation process as described above.

The processor may be further coupled to a user output device 918 via a user output device controller 920 coupled to the I/O bus. The processor uses the user output device to display a user interface to a user to prompt the user of selections of color data and procedures used in the transform-based profile generation process.

The processor may be further coupled to a user input device 914 via a user input device controller 916 coupled to the I/O bus. The processor uses the user input device to receive selections of color data and procedures used in the transform-based profile generation process.

The processor may be further coupled to a communications device 922 via a communications device controller 924 coupled to the I/O bus. The processor may use the communications device to communicate with a transform-based CMM for transfer of the generated transform-based profiles.

In operation, the processor loads the program instructions from the storage device into the memory. The processor executes the loaded program instructions to implement the features of the transform-based profile generation process as described above.

The present invention has been described above with respect to particular illustrative embodiments. It is understood that the present invention is not limited to the above-described embodiments and that various changes and modifications may be made by those skilled in the relevant art without departing from the spirit and scope of the invention.

What is claimed is:

1. A color processing apparatus for generating a transform-based profile from a measurement-based device model profile, the color processing apparatus comprising:
   a first initializing unit configured to initialize a device model, which transforms device color data, by using color measurement data for a color device of the measurement-based device model profile;
   a first creating unit configured to create a device gamut boundary by using the device model;
   a second creating unit configured to create a profile connection space gamut boundary;
   a second initializing unit configured to initialize a gamut mapping model by using the device gamut boundary and the profile connection space gamut boundary; and
   a generating unit configured to transform sampling data in a device color space by using the device model and the gamut mapping model and generate an AtoB look-up-table in the transform-based profile.

2. The color processing apparatus according to claim 1, wherein the first creating unit comprises an appearance data generating unit configured to generate appearance data from device measurement data by using a color appearance model, and
wherein the device gamut boundary is created from the generated appearance data.

3. A color processing apparatus for generating a transform-based profile from a measurement-based device model profile, the color processing apparatus comprising:
   a first initializing unit configured to initialize a device model, which transforms device color data, by using color measurement data for a color device of the measurement-based device model profile;
   a first creating unit configured to create a device gamut boundary by using the device model;
   a second creating unit configured to create a profile connection space gamut boundary;
   a second initializing unit configured to initialize a gamut mapping model by using the device gamut boundary and the profile connection space gamut boundary; and
   a generating unit configured to transform sampling data in a profile connection space by using the device model and the gamut mapping model and generating a B to A lookup table in the transform-based profile.

4. A method for a color processing apparatus for generating a transform-based profile from a measurement-based device model profile, the method comprising:
   performing by a processor the following steps:
   a first initializing step of initializing a device model, which transforms device color data, by using color measurement data for a color device of the measurement-based device model profile;
   a first creating step of creating a device gamut boundary by using the device model;
   a second creating step of creating a profile connection space gamut boundary;
   a second initializing step of initializing a gamut mapping model by using the device gamut boundary and the profile connection space gamut boundary; and
   a generating step of transforming sampling data in a device color space by using the device model and the gamut mapping model and generating an AtoB look-up-table in the transform-based profile.

5. The method according to claim 4,
   wherein the first creating step comprises an appearance data generating step of generating appearance data from device measurement data by using a color appearance model, and
   wherein the device gamut boundary is created from the generated appearance data.

6. A method for a color processing apparatus for generating a transform-based profile from a measurement-based device model profile, the method comprising:
   performing by a processor the following steps:
   a first initializing step of initializing a device model, which transforms device color data, by using color measurement data for a color device of the measurement-based device model profile;
   a first creating step of creating a device gamut boundary by using the device model;
   a second creating step of creating a profile connection space gamut boundary;
   a second initializing step of initializing a gamut mapping model by using the device gamut boundary and the profile connection space gamut boundary; and
   a generating step of transforming sampling data in a profile connection space by using the device model and the gamut mapping model and generating a BtoA lookup table in the transform-based profile.

7. A computer-readable medium storing a computer program for a color processing apparatus for generating a transform-based profile from a measurement-based device model profile, the program comprising:
   a first initializing step of initializing a device model, which transforms device color data, by using color measurement data for a color device of the measurement-based device model profile;

a first creating step of creating a device gamut boundary by using the device model;

a second creating step of creating a profile connection space gamut boundary;

a second initializing step of initializing a gamut mapping model by using the device gamut boundary and the profile connection space gamut boundary; and a generating step of transforming sampling data in a device color space by using the device model and the gamut mapping model and generating an AtoB look-up-table in the transform-based profile.

8. The program according to claim 7, wherein the first creating step comprises an appearance data generating step of generating appearance data from device measurement data by using a color appearance model, and wherein the device gamut boundary is created from the generated appearance data.

9. A computer-readable medium storing a computer program for a color processing apparatus for generating a transform-based profile from a measurement-based device model profile, the program comprising:

a first initializing step of initializing a device model, which transforms device color data, by using color measurement data for a color device of the measurement-based device model profile;

a first creating step of creating a device gamut boundary by using the device model;

a second creating step of creating a profile connection space gamut boundary;

a second initializing step of initializing a gamut mapping model by using the device gamut boundary and the profile connection space gamut boundary; and a generating step of transforming sampling data in a profile connection space by using the device model and the gamut mapping model and generating a BtoA lookup table in the transform-based profile.

* * * * *